(12) United States Patent
Hambaly et al.

(10) Patent No.: US 12,475,572 B2
(45) Date of Patent: Nov. 18, 2025

(54) SYSTEM AND METHOD FOR DYNAMIC REDACTION

(71) Applicant: MOTOROLA SOLUTIONS, INC., Chicago, IL (US)

(72) Inventors: Alfy Merican Ahmad Hambaly, Bayan Baru (MY); Murali Kuyimbil, Penang (MY); Naveendran Al Kumannan, Kuala Krai (MY); Choon Hwa Gan, Taiping (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 430 days.

(21) Appl. No.: 18/058,897

(22) Filed: Nov. 28, 2022

(65) Prior Publication Data

US 2024/0177324 A1 May 30, 2024

(51) Int. Cl.
*G06T 7/215* (2017.01)
*G06T 7/11* (2017.01)
*G06T 11/40* (2006.01)
*G06V 10/25* (2022.01)

(52) U.S. Cl.
CPC ............. *G06T 7/215* (2017.01); *G06T 7/11* (2017.01); *G06T 11/40* (2013.01); *G06V 10/25* (2022.01); *G06T 2207/10016* (2013.01); *G06T 2207/20104* (2013.01)

(58) Field of Classification Search
CPC ........ G06V 10/25; G06V 20/52; G06T 11/00; G06T 11/40; G06T 2207/20104; G06T 7/11; G06T 2207/20132; G06T 7/215; G06T 7/13; G06T 2207/10016; G06T 2207/30232; H04N 5/272
See application file for complete search history.

(56) References Cited

U.S. PATENT DOCUMENTS

| | | | |
|---|---|---|---|
| 10,319,412 B2 | 6/2019 | Ding et al. | |
| 11,232,817 B2 | 1/2022 | Michaud et al. | |
| 2010/0328460 A1* | 12/2010 | Merkel | G06V 20/52 348/143 |
| 2019/0080196 A1 | 3/2019 | Choi et al. | |
| 2020/0082851 A1* | 3/2020 | Chau | G11B 27/031 |
| 2020/0098096 A1* | 3/2020 | Moloney | G06V 10/82 |
| 2021/0035342 A1* | 2/2021 | Glaser | G06V 20/52 |
| 2023/0195934 A1* | 6/2023 | Gustof | G06F 21/6254 726/26 |

\* cited by examiner

*Primary Examiner* — Michael Horabik
*Assistant Examiner* — Stefano Anthony Dardano (57) ABSTRACT

Techniques for dynamic redaction are provided. At least one object within a video to be redacted is identified. At least one region including the at least one object is redacted. The at least one redacted region including the at least one object and being larger than the at least one object. A tracked region being separate from the at least one object is identified. When the tracked region intersects with the at least one redacted region, the at least one redacted region is modified to un-redact portions of the at least one redacted region that overlap the tracked region.

15 Claims, 11 Drawing Sheets

SYSTEM AND METHOD FOR DYNAMIC REDACTION

BACKGROUND

The presence of cameras in today's world has become ubiquitous. It is very likely that whenever a person is in a public space, they are being recorded by at least one camera. Another area that has seen an increase in the use of cameras is in public safety, such as law enforcement. Police officers are likely equipped with multiple cameras (e.g. in car camera, body worn camera, etc.). What should be understood is that a person, uninvolved in any type of offensive activity, may have their image captured by a camera. In addition, other identifying information (e.g. vehicle license plate, etc.) may also be captured.

In many cases, the captured video is released to the public. For example, police body worn camera footage of an incident may be released to the media. In order to protect the privacy of those that are not involved (e.g. innocent bystanders, etc.) or those whose images cannot be released (e.g. minors, etc.) the images of those persons may be redacted. Similarly, identifying information (e.g. vehicle license plates, etc.) may also be redacted.

In order to make the redaction process easier, automatic redaction systems have been created. These systems may generally perform the automatic redaction using one of two general techniques. In the first technique, the object to be redacted is identified and a redaction mask is applied such that the object itself, as well as an additional surrounding area, is obscured. For example, if a person's face is being redacted, the redaction mask could include a square that covers the person's face as well as an area larger than the person's face. The advantage of this technique is that the area to be redacted only needs to be roughly identified, thus requiring less computational power to identify the specific edges of the object (e.g. the actual outline of a face, etc.). Because less computation is required, the automatic redaction process can be faster. The tradeoff is that areas of the image may be redacted that did not need to be redacted.

In the second technique, the actual boarder of the object to be redacted is identified. For example, in the case of a face, the outline of the face only may be identified. Redaction is then applied only within the actual boarder. Although the second technique prevents redaction of areas that did not need to be redacted, this comes at the expense of additional computational complexity. The automatic redaction system can no longer generally identify the object to be redacted, but must specifically compute the outline of the object. This extra computation may cause the redaction process to be slower.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In many cases, the video that is being redacted and released to the public may also include an area of interest to the viewer that is not to be redacted. For example, in the case of a body worn camera video from law enforcement, the face of a suspect may be the area of interest and should not be redacted. In other cases, the area of interest may include an object, such as a weapon, which should not be redacted. The area of interest may be referred to as a tracked region.

Assuming that the video is redacted using the first technique described above, a problem arises when the object in the tracked region moves into the redaction mask area. Because the redaction mask area is over inclusive, portions of the tracked region may be redacted if they fall under the redaction mask. However, the portion of the redaction mask that overlaps with the tracked region may not actually include the object that is being redacted. For example, consider a face that is being redacted by a large square placed over the face (e.g. over inclusive). As a tracked region enters this redaction mask area, it will be redacted, even if the tracked region does not ever actually intersect with the face that is being redacted.

To resolve this problem, the techniques described herein may switch between the two general techniques for redaction described above. When the tracked region does not overlap with the object to be redacted, the redaction is performed in accordance with the first technique described above. However, as the tracked region begins to overlap with the redaction mask, the redaction mask is modified to conform with the actual outline of the object to be redacted (e.g. the second technique) for only those portions where the overlap occurs. Thus, although additional processing power is required when an overlap occurs, that additional processing power is only used for areas where the tracked region overlaps the redaction mask.

A method of dynamic redaction is provided. The method includes identifying at least one object within a video to be redacted. The method further includes redacting at least one region including the at least one object, the at least one redacted region including the at least one object and being larger than the at least one object. The method further includes identifying a tracked region, the tracked region being separate from the at least one object. The method further includes, when the tracked region intersects with the at least one redacted region, modifying the at least one redacted region to un-redact portions of the at least one redacted region that overlap the tracked region.

In one aspect of the method, the modifying of the at least one redacted region is limited by a boundary of the at least one object. In one aspect of the method, the tracked region comprises an object of interest. In one aspect of the method, when the un-redacted portions of the at least one redacted region no longer intersect the tracked region, modifying the at least one redacted region to re-redact portions of the at least one redacted region that were un-redacted.

In one aspect the method further comprises detecting an object of interest in the video, the object of interest substantially occluded by the at least one redacted region and detecting a user has zoomed in on the object of interest, wherein the tracked region includes the object of interest. In one aspect of the method, the tracked region is congruous with the object of interest.

A system for dynamic redaction is provided. The system includes a processor and a memory coupled to the processor. The memory includes a set of instructions thereon that when executed by the processor cause the processor to identify at least one object within a video to be redacted. The instructions on the memory further cause the processor to redact at least one region including the at least one object, the at least one redacted region including the at least one object and being larger than the at least one object. identify a tracked region, the tracked region being separate from the at least one object. The instructions on the memory further cause the processor to, when the tracked region intersects with the at least one redacted region, modify the at least one redacted region to un-redact portions of the at least one redacted region that overlap the tracked region.

In one aspect of the system, the instructions to modify the at least one redacted region is limited by a boundary of the at least one object. In one aspect of the system, the tracked region comprises an object of interest. In one aspect of the system, the memory further includes instructions to, when the un-redacted portions of the at least one redacted region no longer intersect the tracked region, modify the at least one redacted region to re-redact portions of the at least one redacted region that were un-redacted.

In one aspect of the system, the memory further includes instructions to detect an object of interest in the video, the object of interest substantially occluded by the at least one redacted region and detect a user has zoomed in on the object of interest, wherein the tracked region includes the object of interest. In one aspect of the system, the tracked region is congruous with the object of interest.

A non-transitory processor readable medium containing a set of instructions thereon is provided. The instructions, that when executed by a processor, cause the processor to identify at least one object within a video to be redacted. The instructions on the medium further cause the processor to redact at least one region including the at least one object, the at least one redacted region including the at least one object and being larger than the at least one object. The instructions on the medium further cause the processor to identify a tracked region, the tracked region being separate from the at least one object. The instructions on the medium further cause the processor to, when the tracked region intersects with the at least one redacted region, modify the at least one redacted region to un-redact portions of the at least one redacted region that overlap the tracked region.

In one aspect of the medium, the instructions to modify the at least one redacted region is limited by a boundary of the at least one object. In one aspect of the medium, the tracked region comprises an object of interest. In one aspect of the medium, he medium further includes instructions to, when the un-redacted portions of the at least one redacted region no longer intersect the tracked region, modify the at least one redacted region to re-redact portions of the at least one redacted region that were un-redacted.

In one aspect of the medium, the medium further includes instructions to detect an object of interest in the video, the object of interest substantially occluded by the at least one redacted region and detect a user has zoomed in on the object of interest, wherein the tracked region includes the object of interest. In one aspect of the medium, the tracked region is congruous with the object of interest.

Further advantages and features consistent with this disclosure will be set forth in the following detailed description, with reference to the figures.

Figure 1A:
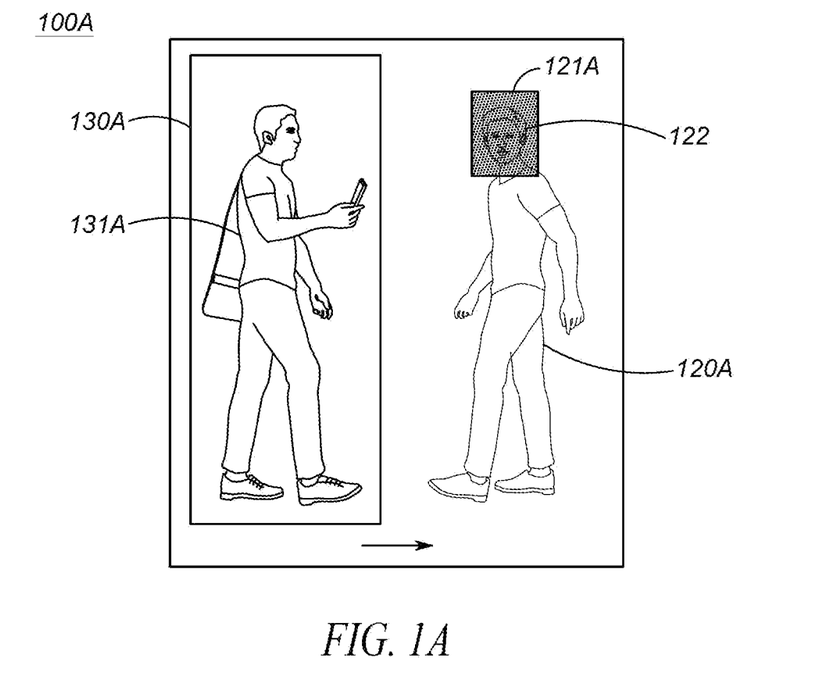
FIGS. 1A-1D depict an example of dynamic redaction according to the techniques described herein.

FIGS. 1A-1D depict an example of dynamic redaction according to the techniques described herein. FIG. 1A depicts a screenshot 100A of a video that has been captured by a video camera. The scene depicts a person 120A whose face 122 has been redacted by an automatic redaction system. As shown, the redaction mask 121A covers the area of the face 122 of person 120A, as well as some of the surrounding area. As explained above, by making the redaction mask 121A a fixed size that generally is over inclusive of the object being redacted (e.g. the face of person 120A), it requires less computational power, as well as less time, to perform the redaction, as the actual boundaries of the object need not be calculated.

FIG. 1A also depicts a tracked region 130A of interest that includes an object of interest 131A, which in this example is a person. It should be understood that although FIG. 1A is described in terms of both the object to be redacted and the object of interest being people, this is just for ease of description. The techniques described herein are applicable regardless of the types of the object to be redacted and the object of interest. For ease of description of FIGS. 1A-1D, assume the person 120A is remaining stationary, while the tracked region 130A is moving from left to right. As shown in FIG. 1A, since there is no overlap between the tracked region 130A and the redaction mask 121A, there is no need to modify the redaction mask 121A.

Figure 1B:
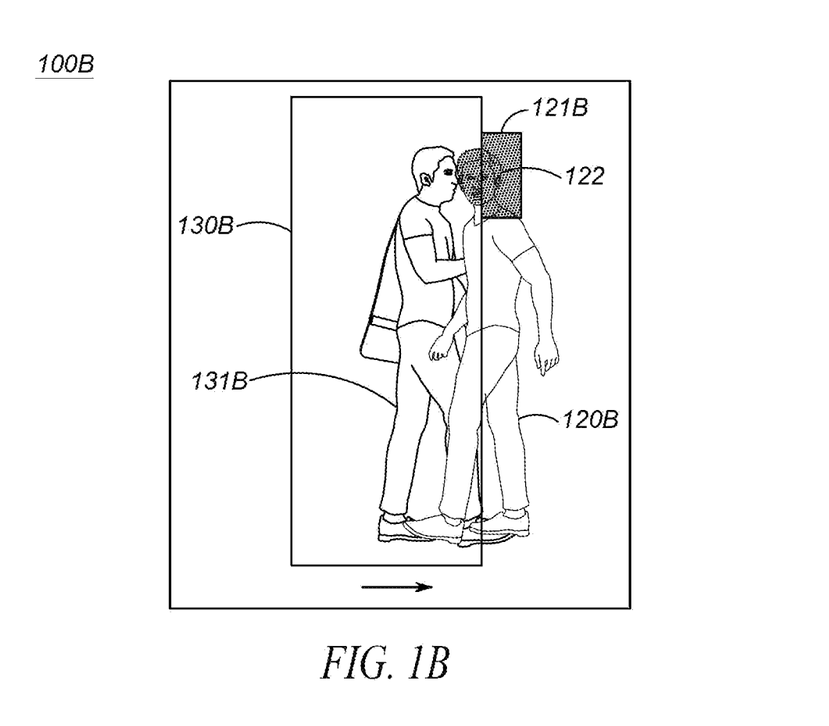

FIG. 1B depicts screenshot 100B whish is later in time than screenshot 100A. In FIG. 1B, the region of interest 130B including person 131B has now moved such that it overlaps with the redaction mask 121B. In accordance with the techniques described herein, the automatic redaction system modifies the redaction mask 121B, such that portions of the redaction mask 121B that overlap with the tracked region 130B, but do not actually include the object to be redacted (e.g. face 122) of person 120B are no longer redacted. Although this requires additional processing power to determine the actual boundary of the face 122 that is overlapping with the tracked region, it ensures that the tracked region is only redacted to the extent that it overlaps with the object to be redacted, and not just the redaction mask.

Figure 1C:
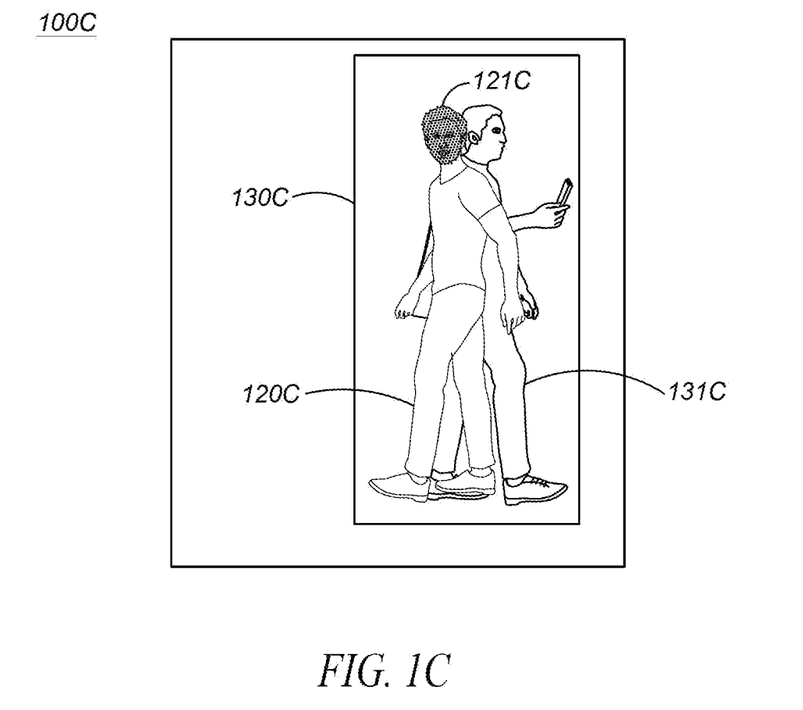

FIG. 1C depicts screenshot 100C whish is later in time than screenshot 100B. In FIG. 1C, the tracked region 130C including person 131C now fully overlaps the redaction mask 121C that is redacting the person 120C. As such, the only areas of the redaction mask 121C that remain redacted is the actual object intended to be redacted (e.g. the face 122). Although this form of redaction requires the most computing power, as the boundary of face 122 must be fully computed, it also ensures that only the minimum amount of the tracked region 130C that overlaps with the object to be redacted (e.g. the face 122) is redacted. In other words, the amount of redaction of the tracked region 130C is limited to the boundary of the redacted object (eg. the face 122) and does not include the broader redaction mask.

Figure 1D:
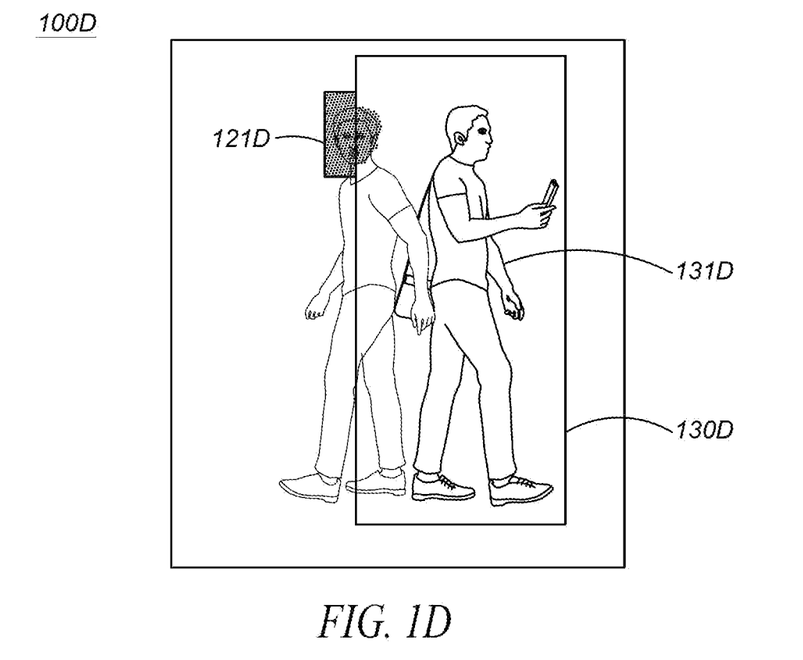

FIG. 1D depicts screenshot 100D which is later in time than screenshot 100C. In FIG. 1D, the person 131D in the region of interest 130D continues to move to the right. As the region of interest 130D reduces the amount of overlap with the redaction mask 121D, the areas that no longer overlap return to the original redaction mask 121D, while areas that still overlap the object to be redacted (e.g. face 122) continue to conform to the actual boundary of the object to be redacted.

Although FIGS. 1A-1D have been described in terms of the tracked region moving and the object to be redacted remaining stationary, this was for ease of description. In an actual implementation both the tracked region and the object to be redacted may move independently. What should be understood is that the portions of overlap are determined and that is what determines how the redaction mask is generated. The actual movement and/or non-movement of each of the object is irrelevant. It should further be noted that although only one tracked region and one object to be redacted are shown, the techniques described herein are not so limited. There can be any number of tracked regions and any number of objects to be redacted.

Figure 2A:
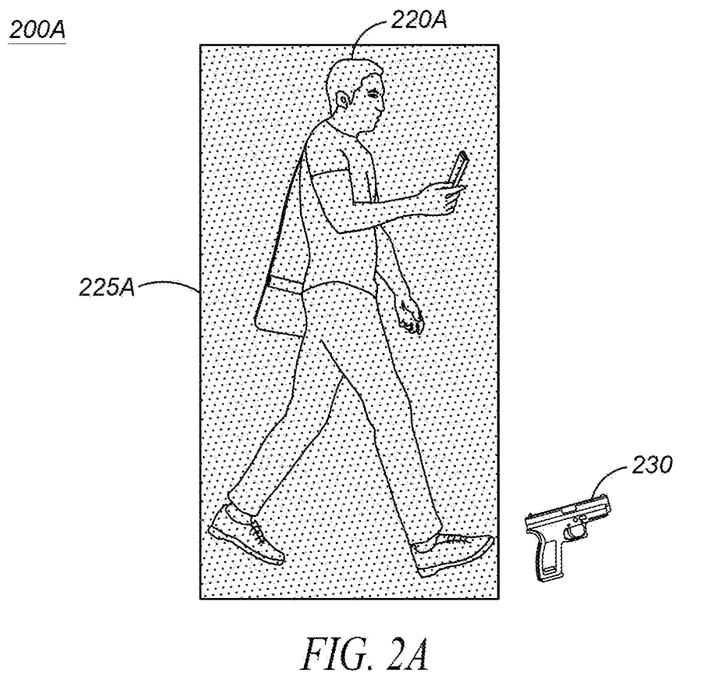
FIGS. 2A-2B depict an example of dynamic redaction when the tracked region is a physical object, according to the techniques described herein.
Figure 2B:
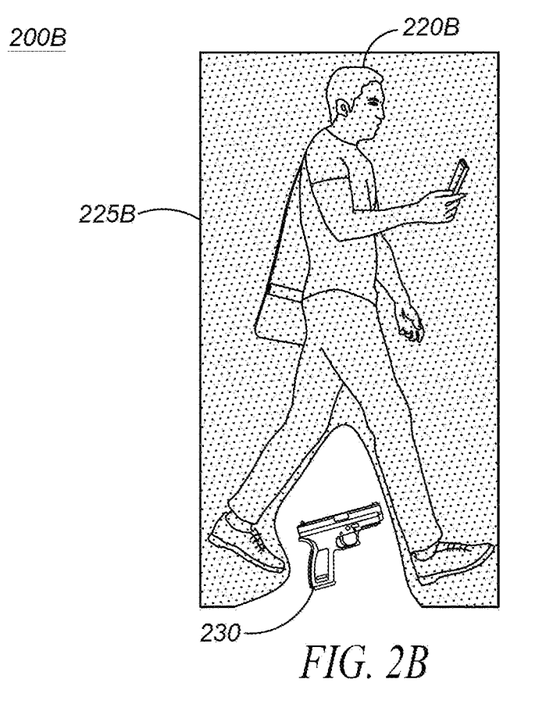

It should be noted that in the description above, the tracked region 130 was defined to be larger than the object (e.g. person 131) that was included in the tracked region. In some implementations, the tracked region itself would be the object of interest itself. However, such implementations would require that the boundary of the object of interest to be computed. As explained above, calculating the exact boundary of an object can be done, but it is computationally intensive. By simply using an easier to calculate tracked region (e.g. fixed shape, etc.) the use of additional computational resources can be avoided. However, it should be understood that the techniques described herein are not so limited. FIGS. 2A-2B describe a tracked region that conforms to a shape of an object.

FIGS. 2A-2B depict an example of dynamic redaction when the tracked region is a physical object, according to the techniques described herein. FIG. 2A is a screenshot 200A of a video. FIG. 2A includes an object to be redacted which in this case includes a person 220A. As shown, in this particular example, the redaction mask 225A is very broad and covers the entire person 220A, not just the persons face or even general location of the persons face, as was described with respect to FIG. 1. By using such an overly inclusive redaction mask, the amount of computation to perform the redaction is minimized. A general location of the person 220A can be identified using reduced computational effort, and then the large redaction mask ensures that the person is fully redacted, without having to actually compute the boundaries of the person. FIG. 2A also includes an object of interest, which in this case is a gun. The tracked region 230 in this case may be the actual outline of the gun (e.g. computational effort was expended to determine the actual boundary of the gun).

FIG. 2B is a screenshot 200B of the video at a later time that screenshot 200A. In FIG. 2B as the person 220B walks toward the gun 230, the redaction mask 225B is modified such that when a portion of the tracked region 230 overlaps with the redaction mask 225B, but does not actually overlap with the object to be redacted (e.g. person 220B), the redaction mask is modified to only redact areas that are actually part of the object to be redacted. As shown in FIG. 2B, as the gun 230 overlaps with the redaction mask 225B, the redaction mask is modified such that it is no longer redacted in areas that do not include the object to be redacted. As shown, the person 220B legs still remain redacted, while the location of the gun is un-redacted, since it does not overlap with the person 220B. It should be understood that this tradeoff comes at the expense of additional computational processing power to define the boundaries of the person's 220B legs. It should also be noted that other portions of the redaction mask 225B that do not overlap the tracked region 230 continue to use the simpler computation, where the exact boundary need not be determined.

Figure 3A:
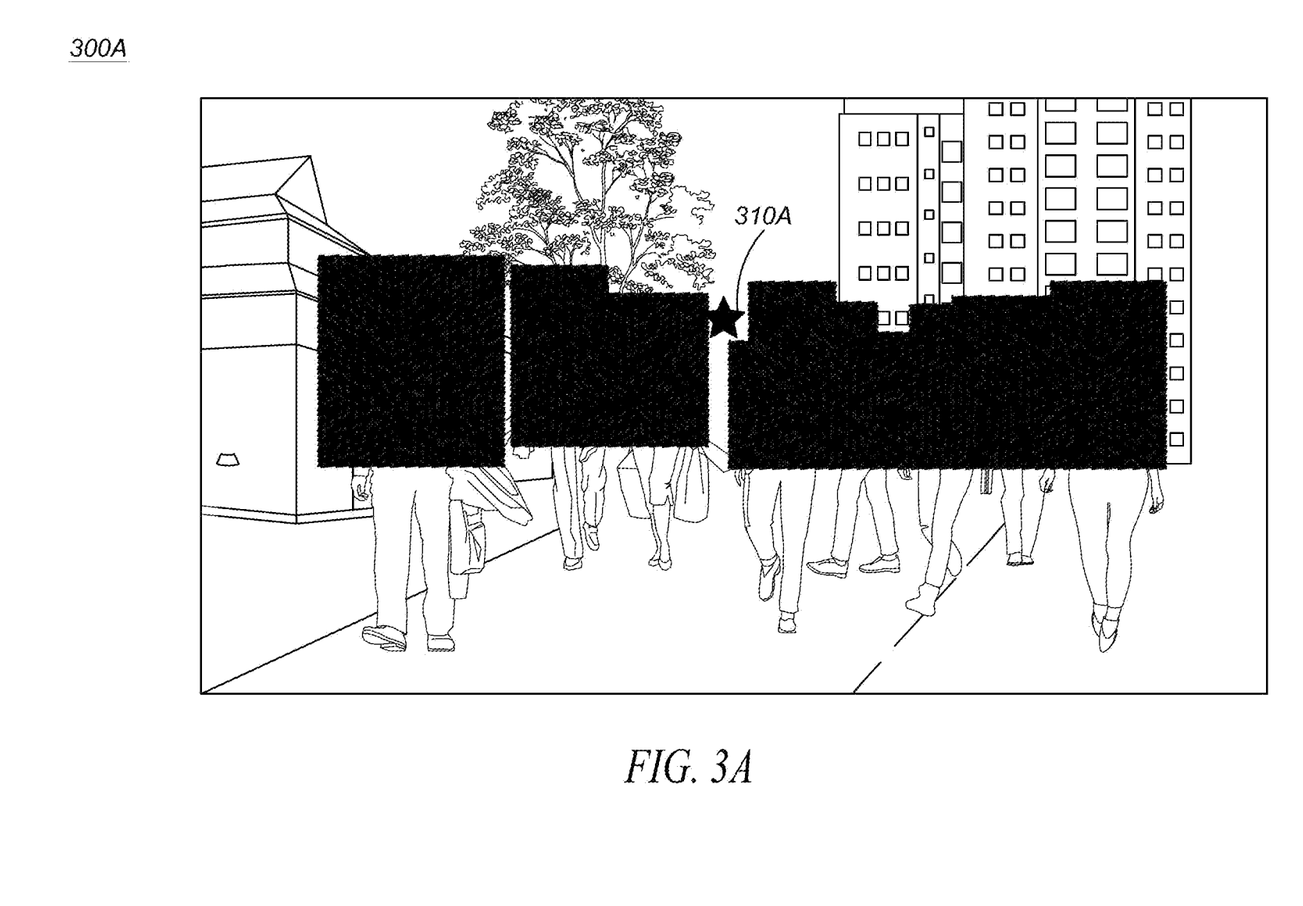
FIGS. 3A-3C depict an example of dynamic redaction when there are many objects to be redacted and the redaction masks overlap and obscure the tracked region.

FIGS. 3A-3C depict an example of dynamic redaction when there are many objects to be redacted and the redaction masks overlap and obscure the tracked region. FIG. 3A depicts a scene 300A of a video which includes many objects to be redacted. As shown, the scene is of several people. Each of the people in the scene has a redaction mask that occludes the entire person's body.

Scene 300A also includes a tracked region 310A. However, because of the overlap of the redaction masks for all the people in scene 300A, it is not possible to view the tracked region, as it is not possible to un-redact the tracked region due to the density of the objects to be redacted. In other words, displaying the tracked region would require that at least a portion of one of the objects to be redacted (the actual object, not the redaction mask) to be shown in the clear. As this would defeat the purpose of redaction, the redaction mask cannot be so modified.

Instead, an indication of the tracked region is displayed. In scene 300A, the tracked region 310A is indicated with a star character, thus notifying the viewer that there is a tracked region that cannot be displayed. The inclusion of the indication of the tracked region may prompt the viewer to zoom in to the image, which will be described in further detail below.

Figure 3B:
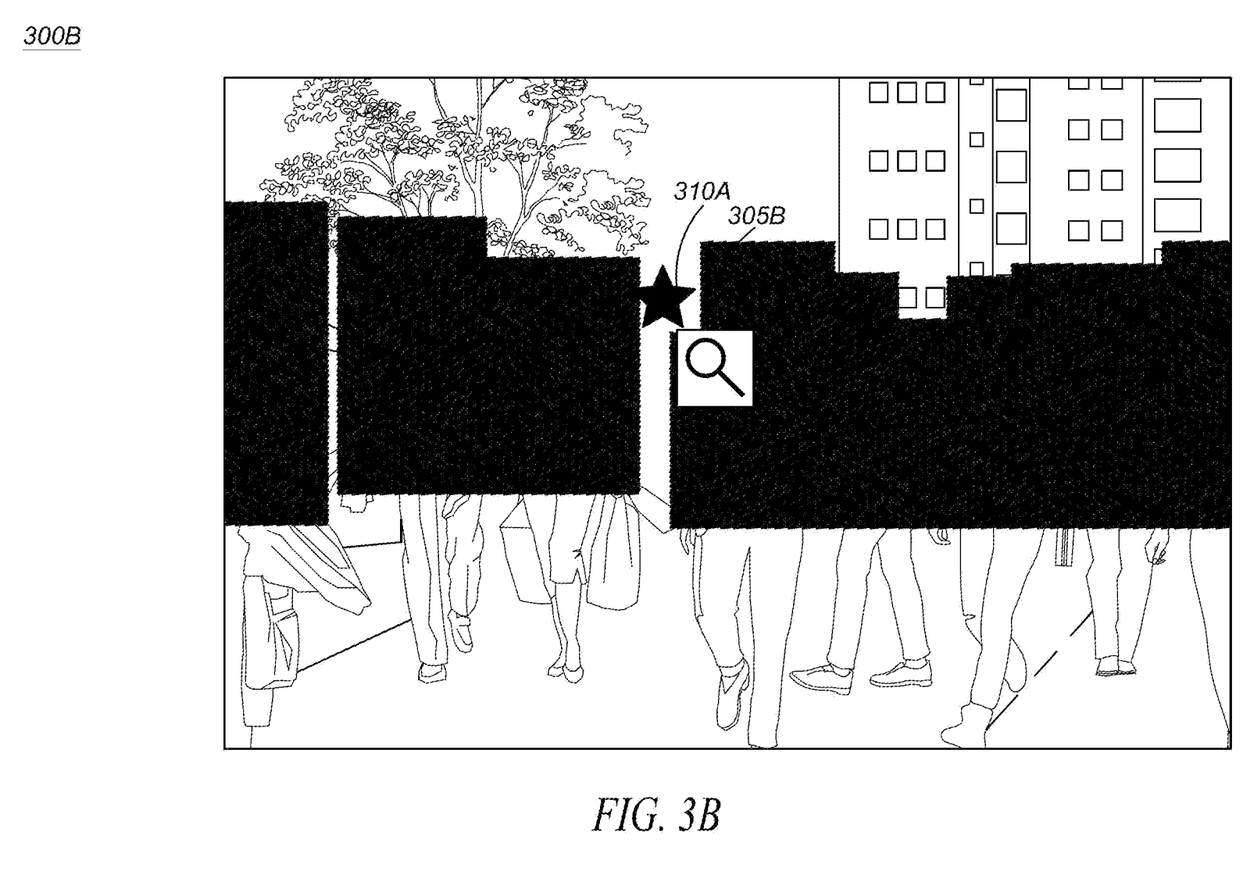

FIG. 3B depicts a scene 300B, in which the user has zoomed in 305B from the scene 300A depicted in FIG. 3A. As shown, the tracked region 310B is still represented by a star character. This means that at this level of zoom, it is still not possible to show the tracked region, as it would still require that portions of an object to be redacted would be revealed.

Figure 3C:
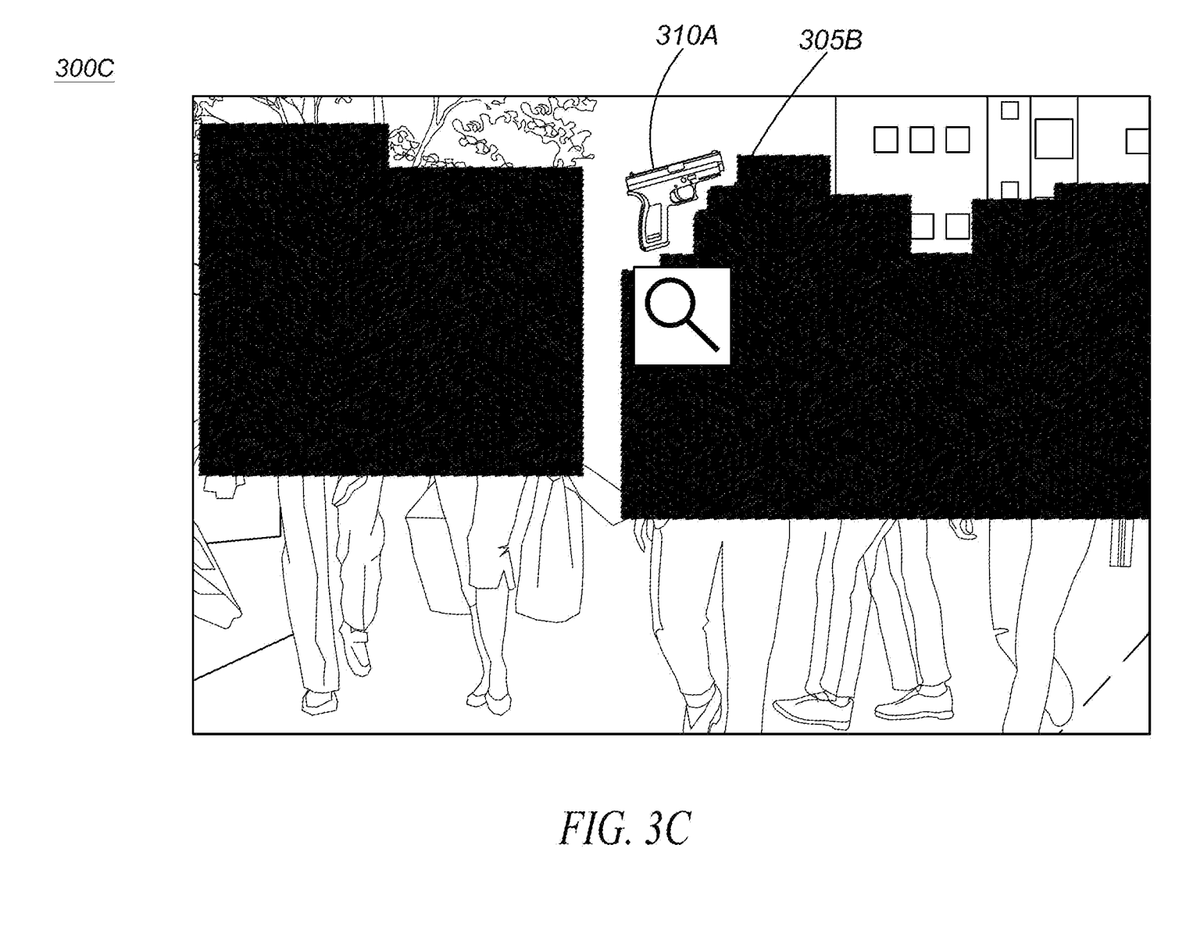

FIG. 3C depicts a scene 300C in which the viewer has zoomed in 305C even further than what was shown in FIG. 3B. As shown at this level of zoom, the tracked region 310C, which in this case depicts a gun, can now be displayed. As shown, the redaction masks for each of the objects to be redacted is modified such that the tracked region can be displayed, without exposing any of the actual object to be tracked.

Figure 4A:
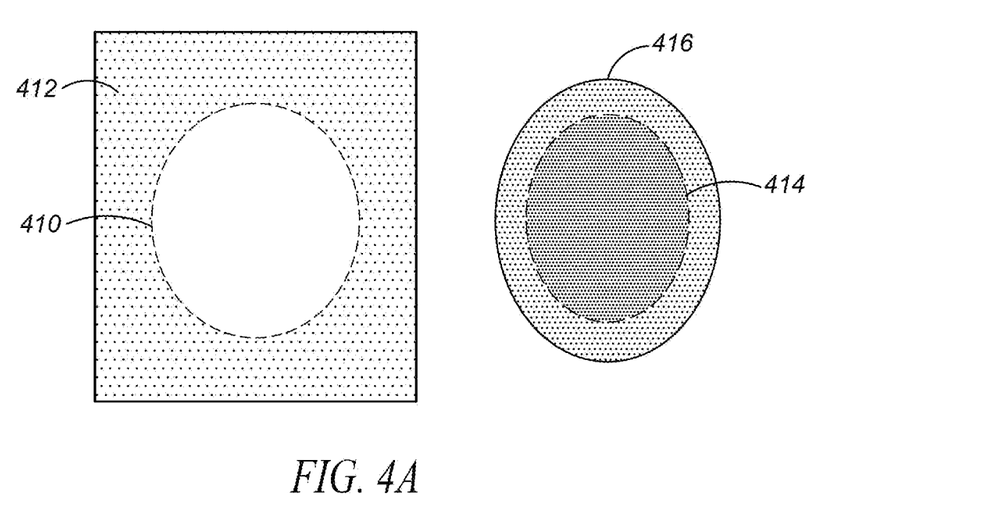
FIGS. 4A-4D depict an example of dynamic abstraction using generalized objects to be redacted and tracked regions, according to the techniques described herein.

FIGS. 4A-4D depict an example of dynamic abstraction using generalized objects to be redacted and tracked regions, according to the techniques described herein. FIG. 4A depicts an object to be redacted 410. The particular reason why the object is being redacted is relatively unimportant. For example, the object to be redacted 410 may be the face of a minor child that cannot be displayed by the media. The object to be redacted 410 has a defined boarder, as is depicted by a circle. It should be understood that depicting the boarder as a circle is for ease of description. The actual boarder could be of any shape.

As mentioned above, it requires additional computation power from an automatic redaction system to identify the boundaries of the object to be redacted 410. Instead, initially the redaction system may generally identify the location of the object to be redacted 410 and redact that area using a redaction mask 412 that completely covers the object to be redacted 410. The redaction mask may also redact additional areas that are not actually part of the object to be redacted 410. This tradeoff allows the computation of the redaction area to be reduced, while at the same time ensuring that the objected to be redacted 410 remains completely redacted.

FIG. 4A also includes an object of interest 414. The object of interest could be anything that is desired to be displayed in the video. For example, the object of interest 414 could be a face of a criminal suspect that law enforcement is requesting assistance from the public, via the media, to locate. The shape of the object of interest 414 is shown as a circle, but this is to aid in the ease of description. The object of interest may be of any shape.

Just as above, calculating the boundary of the object of interest may be computationally complex. In order to reduce the complexity, the system may define a tracked region 416 that includes the object of interest 414. Just as above with the redaction mask 412, it may be easier to operate on a tracked region 416 that is of a fixed size. However, it should be understood that the tracked region 416 and the object of interest 414 could completely overlap. As shown in FIG. 4A, there is no overlap between the object to be redacted 410, the redaction mask 412, the object of interest 414, and the tracked region 416. As such, there is not modification to the redaction mask, and the entire area 412 remains redacted.

Figure 4B:
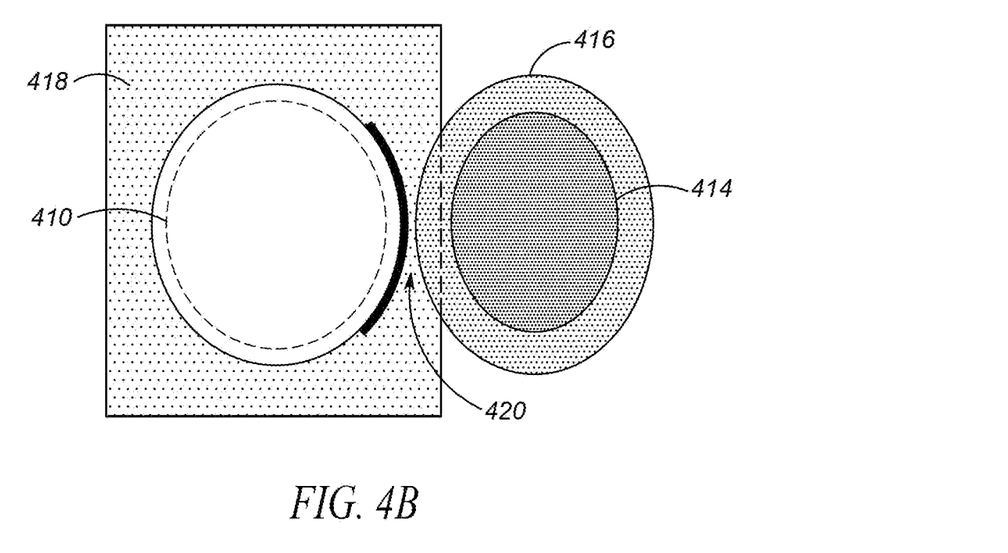

FIG. 4B depicts the tracked region 416 and the redaction mask 418 beginning to overlap. This may occur because the tracked object 414 is moving towards the object to be redacted, the object to be redacted 410 is moving toward the tracked object 414, or both. What should be understood is that there is now an overlap 420 between the tracked region and the redaction mask 418.

Because the overlap of the tracked region 416 and the redaction mask 418 does not include any portion of the object to be redacted 410, the redaction mask 418 can be modified such that the portion of the tracked region 416 that overlaps the redaction mask 418 is not redacted. This prevents the redaction mask 418 from obscuring portions of the tracked region 416.

Figure 4C:
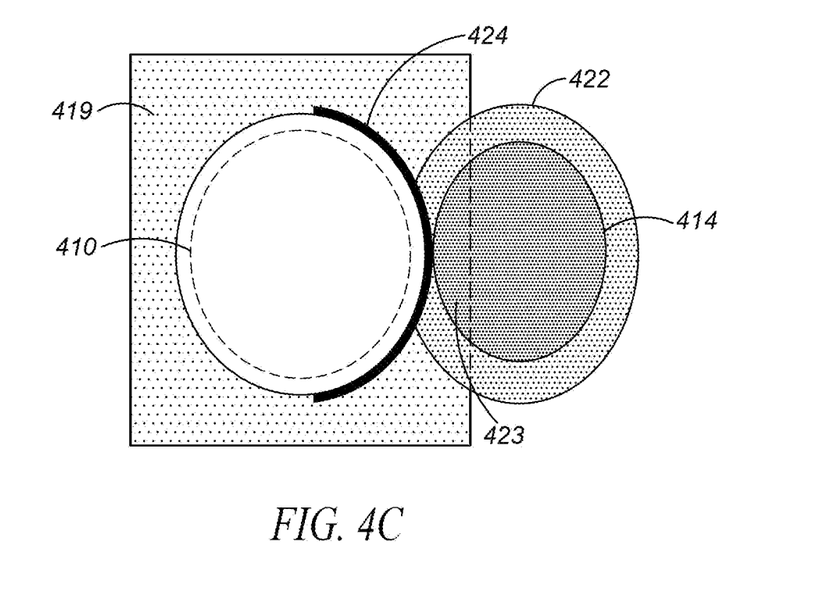

FIG. 4C depicts the overlap between the object of interest 414, the tracked region 422, the redaction mask 419, and the object to be redacted 410 increasing. As mentioned above, the overlap may increase as one or both the object to be redacted 410 and the object of interest 414 move closer to each other. As shown, portions of both the object of interest 414 and the tracked region 422 have begun to overlap with the redaction mask 419. For portions of the overlap 423 that do not also include the object to be redacted 410, the redaction mask 419 can be modified to not obscure those portions. However, for portions 424 of the overlap that do include the object to be redacted, those portions may remain redacted. As explained above, the ability to redact up to the boundary of the object to be redacted comes at the expense of additional computational complexity. However, the tradeoff for the additional computational complexity is that the tracked region 422 and the object of interest 414 are not unnecessarily obscured by the redaction mask 419.

Figure 4D:
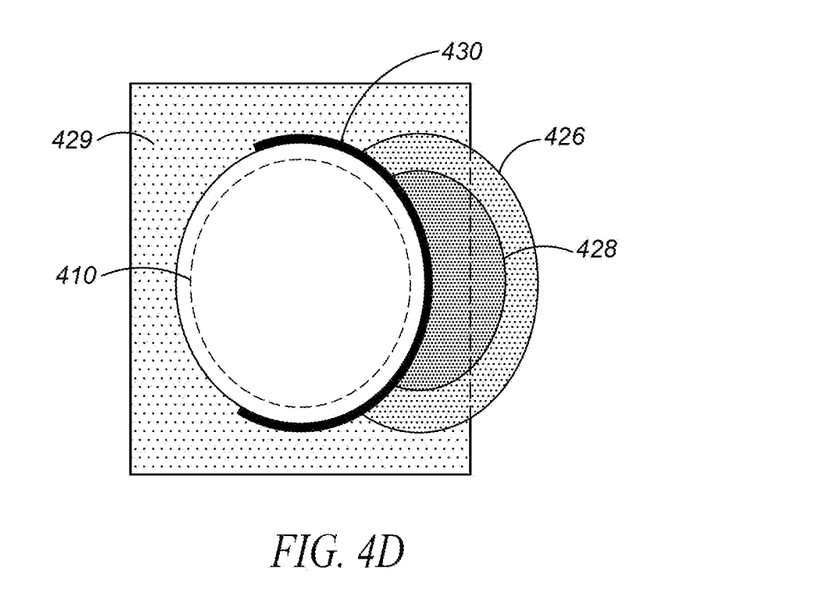

FIG. 4D depicts the overlap between the object of interest 428, the tracked region 426, the object to be redacted 410, and the redaction mask 429 continuing to increase. As shown, the overlap 430 between the tracked region 426 and the object of interest 428 now both overlap with the object to be redacted 410. As such, the redaction mask 429 is modified so as to not redact any portion of the tracked region or the object of interest that do not overlap with the object to be redacted 410. Likewise, and area that does overlap with the object to be redacted 410 remains redacted.

Figure 5:
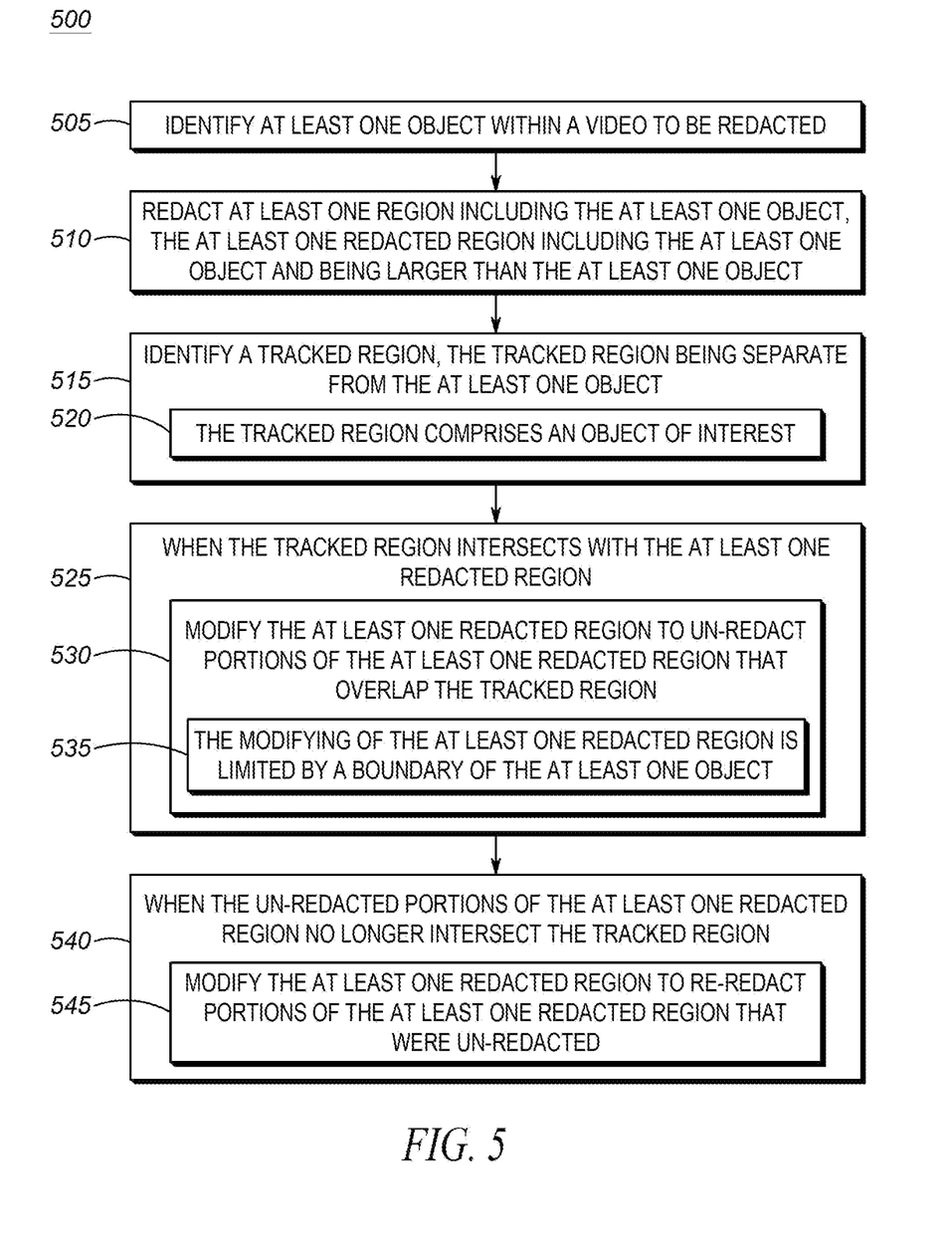
FIG. 5 depicts an example flow diagram illustrating the dynamic redaction techniques described herein.

FIG. 5 depicts an example flow diagram 500 illustrating the dynamic redaction techniques described herein. In block 505, at least one object to be redacted is identified within a video. As described above, there may be many reasons why an object in a video is an object to be redacted. People may need to be redacted because they are minors or innocent bystanders. Objects, such as license plates may need to be redacted as they include identifying information. The particular reason why an object needs to be redacted is unimportant. What should be understood is that objects to be redacted are identified.

In block 510, at least one region including the at least one object may be redacted. The at least one redacted region including the at least one object and being larger than the at least one object. In order to reduce processing power, the region to be redacted may be larger than the object to be redacted. By making this redacted region, which can also be referred to as the redaction mask, larger than the object to be redacted, the actual boundaries of the object to be redacted need not be computed. This requires less computational resources and provides for faster redaction. The techniques described herein may utilize any known available techniques for redaction of an object using a redaction mask.

In block 515, a tracked region may be identified. The tracked region may be separate from the at least one object. The tracked region may be a region within the video frame that is of interest to the viewer. As shown in block 520, the tracked region may comprise an object of interest. An object of interest may include an object such as a person's face, a license plate, a weapon, etc. The particular object of interest is unimportant. What should be understood is that the object of interest is an object that the viewer of the video desires to see (e.g. not be redacted).

The tracked region may be larger than the object of interest. Computation of the exact boundaries of the object of interest may be complex and time consuming (just as with calculating the boundaries of the object to be redacted). To reduce this computational burden, the tracked region may be larger than the object of interest, just as the redaction mask is larger than the object to be redacted. However, the techniques described herein are suitable for use when the tracked region and the object of interest are congruous.

In block 525, when the tracked region intersects with the at least one redacted region certain steps are performed. As the video plays and the objects within the video move around, it is possible that the tracked region (e.g. the region that includes the object of interest to be viewed) and the redacted region (e.g. the area covered by the redaction mask) intersect, whereas intersection means that the regions overlap. Absent the techniques described herein, when such a situation occurs, the portion of the overlap would remain redacted, as the redaction mask would have higher preference than the tracked region.

With the present techniques, this situation is avoided. In block 530, the at least one redacted region is modified to un-redact portions of the at least one redacted region that overlap the tracked region. In other words, for the areas of overlap between the tracked region and the redacted region, the redaction that was previously applied is removed. This could also include never applying redaction to the overlap region in the first place. What should be understood is that the overlap region is not redacted.

To ensure that no portion of the object to be redacted is revealed, the modifying of the redacted region is limited. As shown in block 535, the modifying of the at least one redacted region is limited by a boundary of the at least one object. This means that the redacted region may be modified by un-redacting portions of the redaction mask right up to the boundary of the object to be redacted. In other words, the boundaries of the object to be redacted are computed (incurring the cost of additional time and computational complexity) and the redacted region can be un-redacted only to the extent that the un-redaction does not cross the boundary of the object to be redacted. As such, the un-redaction will never cause portions of the actual object of interest to be revealed.

In block 540, when the un-redacted portions of the at least one redacted region no longer intersect the tracked region, certain steps are performed. As the video continues to play, the object to be redacted and the tracked region may move away from each other, such that there is less, or even no, overlap between the regions. When such a situation occurs, in block 545 the at least one redacted region may be modified to re-redact portions of the at least one redacted region that were un-redacted.

In other words, as the tracked region and the redacted region reduce the amount of overlap, portions that were previously un-redacted, such as in block 530, may now be redacted again, since there is no longer an overlap. As the overlap continues to decrease, the redaction may eventually return to the case where the original redaction mask is used to redact the object to be redacted. The system may then return to using lower computational power for redaction, as there would no longer be a need to compute the actual boundary of the object to be redacted.

Figure 6:
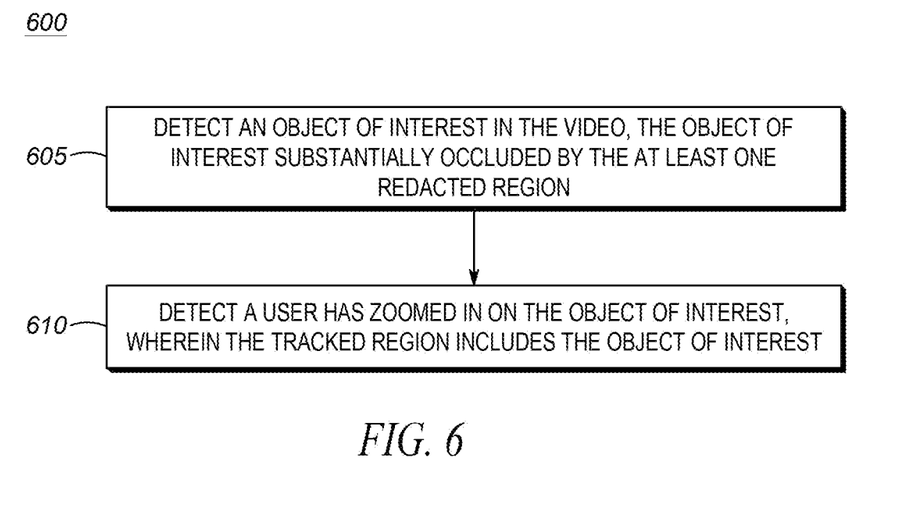
FIG. 6 depicts an example flow diagram illustrating the dynamic redaction techniques described herein when utilized in conjunction with zoom.

FIG. 6 depicts an example flow diagram 600 illustrating the dynamic redaction techniques described herein when utilized in conjunction with zoom. In block 605, an object of interest in the video may be detected. The object of interest substantially occluded by the at least one redacted region. As explained above with respect to FIGS. 3A-3C, it is possible that an object of interest is occluded because the redaction mask of many different objects to be redacted are in close proximity to each other. The object of interest may have been indicated in the video by a marker (e.g. a star).

In block 610, it may be detected that the user has zoomed in on the object of interest, wherein the tracked region includes the object of interest. Once the zooming in process is completed, the remainder of the process described with respect to FIG. 5 may occur, in that areas that do not overlap the object to be redacted may be un-redacted.

Figure 7:
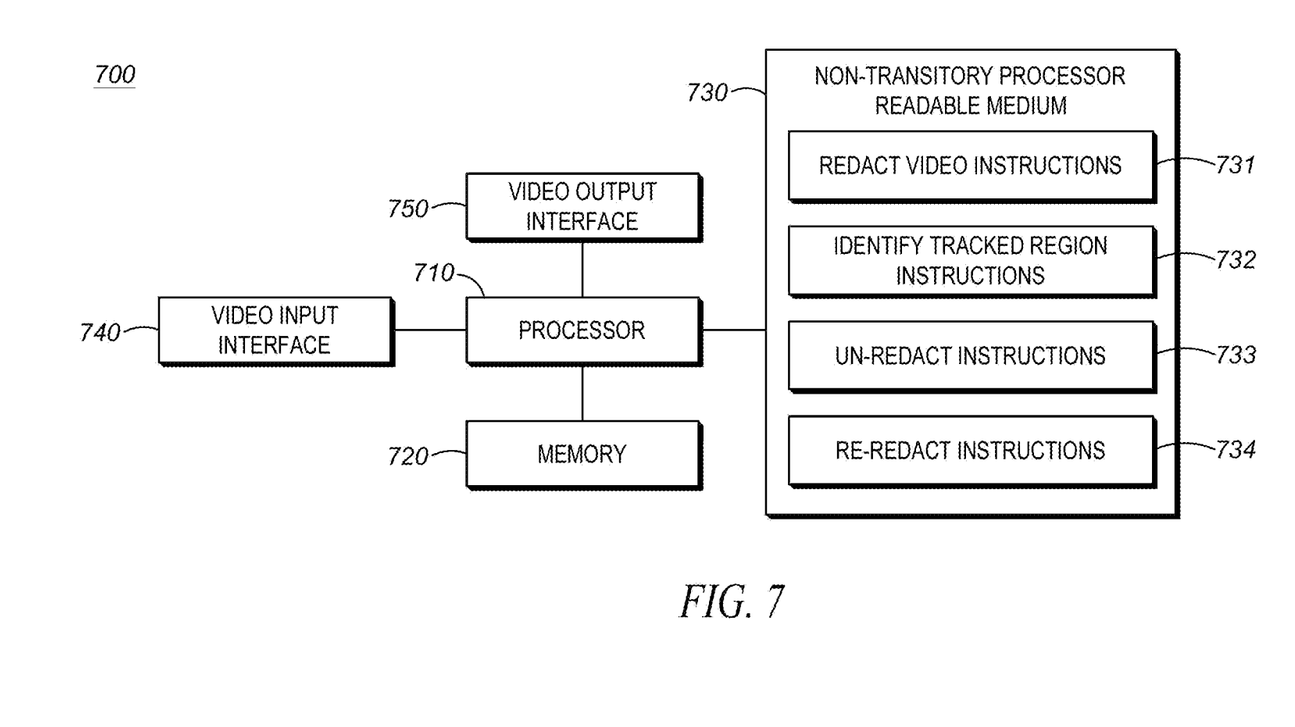
FIG. 7 depicts an example of a device that may implement the dynamic redaction techniques described herein.

FIG. 7 depicts an example of a device 700 that may implement the dynamic redaction techniques described herein. It should be understood that FIG. 7 represents one example implementation of a computing device that utilizes the techniques described herein. Although only a single processor is shown, it would be readily understood that a person of skill in the art would recognize that distributed implementations are also possible. For example, the various pieces of functionality described above (e.g. video redaction, region tracking, etc.) could be implemented on multiple devices that are communicatively coupled. FIG. 7 is not intended to imply that all the functionality described above must be implemented on a single device.

Device 700 may include processor 710, memory 720, non-transitory processor readable medium 730, video input interface 740, and video output interface 750.

Processor 710 may be coupled to memory 720. Memory 720 may store a set of instructions that when executed by processor 710 cause processor 710 to implement the techniques described herein. Processor 710 may cause memory 720 to load a set of processor executable instructions from non-transitory processor readable medium 730. Non-transitory processor readable medium 730 may contain a set of instructions thereon that when executed by processor 710 cause the processor to implement the various techniques described herein.

For example, medium 730 may include redact video instructions 731. The redact video instructions 731 may cause the processor to receive video input from video input interface 740. The video input interface 740 could be, for example, an interface that connects to a video management system, that stores videos for a public safety agency that may require redaction prior to being publically released. The redact video instructions 731 may cause the processor to identify objects within the input video that need to be redacted and redact those objects. The redact video instructions 731 are described generally throughout the specification, including places such as the description of blocks 505 and 510.

The medium 730 may include identify tracked region instructions 732. The identify tracked region instructions 732 may cause the processor to identify regions within the input video that include objects of interest (e.g. objects that the viewer wishes to see.). The identify tracked region instructions 732 are described generally throughout the specification, including places such as the description of blocks 515 and 520.

The medium 730 may include un-redact instructions 733. The un-redact instructions 733 may cause the processor to determine areas of overlap between the tracked region and the object to be redacted. The un-redact instructions 733 may cause the processor to un-redact those regions of overlap that do not expose the actual object to be redacted. The resulting video may be output via the video output interface 750 which could be an interface to send video to the public/media. The un-redact instructions 733 are described generally throughout the specification, including places such as the description of blocks 525-535.

The medium 730 may include re-redact instructions 734. The re-redact instructions 734 may cause the processor to determine when there is no longer an overlap between the tracked region and the object to be redacted. In such cases, the redaction may be reapplied, as there is no longer an overlap. The resultant video may also be output via the video output interface 750. The re-redact instructions 734 are described generally throughout the specification, including places such as the description of blocks 540 and 545.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot redact and un-redact video, among other features and functions set forth herein). Furthermore, it should be noted that the techniques described herein are not abstract as they have been integrated into the practical application of efficient redaction of video such that processing power is reduced when there is no overlap between a tracked region and an object to be redacted.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of dynamic redaction comprising:
 identifying at least one object within a video to be redacted;
 redacting at least one region including the at least one object, the at least one redacted region including the at least one object and being larger than the at least one object;
 identifying a tracked region, the tracked region being separate from the at least one object; and
 when the tracked region intersects with the at least one redacted region:
  modifying the at least one redacted region to un-redact portions of the at least one redacted region that overlap the tracked region, wherein the modifying of the at least one redacted region is limited by a boundary of the at least one object.

2. The method of claim 1 wherein the tracked region comprises an object of interest.

3. The method of claim 1 further comprising:
 when the un-redacted portions of the at least one redacted region no longer intersect the tracked region:
 modifying the at least one redacted region to re-redact portions of the at least one redacted region that were un-redacted.

4. The method of claim 1 further comprising:
 detecting an object of interest in the video, the object of interest substantially occluded by the at least one redacted region; and
 detecting a user has zoomed in on the object of interest, wherein the tracked region includes the object of interest.

5. The method of claim 2 wherein the tracked region is congruous with the object of interest.

6. A system for dynamic redaction comprising:
 a processor; and
 a memory coupled to the processor, the memory containing a set of instructions thereon that when executed by the processor cause the processor to:
  identify at least one object within a video to be redacted;
  redact at least one region including the at least one object, the at least one redacted region including the at least one object and being larger than the at least one object;
  identify a tracked region, the tracked region being separate from the at least one object; and
  when the tracked region intersects with the at least one redacted region:
   modify the at least one redacted region to un-redact portions of the at least one redacted region that overlap the tracked region, wherein the instructions to modify the at least one redacted region is limited by a boundary of the at least one object.

7. The system of claim 6 wherein the tracked region comprises an object of interest.

8. The system of claim 6 wherein the memory further includes instructions to:
 when the un-redacted portions of the at least one redacted region no longer intersect the tracked region:
 modify the at least one redacted region to re-redact portions of the at least one redacted region that were un-redacted.

9. The system of claim 6 wherein the memory further includes instructions to:
 detect an object of interest in the video, the object of interest substantially occluded by the at least one redacted region; and
 detect a user has zoomed in on the object of interest, wherein the tracked region includes the object of interest.

10. The system of claim 7 wherein the tracked region is congruous with the object of interest.

11. A non-transitory processor readable medium containing a set of instructions thereon that when executed by a processor cause the processor to:
 identify at least one object within a video to be redacted;
 redact at least one region including the at least one object, the at least one redacted region including the at least one object and being larger than the at least one object;

identify a tracked region, the tracked region being separate from the at least one object; and when the tracked region intersects with the at least one redacted region:

modify the at least one redacted region to un-redact portions of the at least one redacted region that overlap the tracked region, wherein the instructions to modify the at least one redacted region is limited by a boundary of the at least one object.

12. The medium of claim 11 wherein the tracked region comprises an object of interest.

13. The medium of claim 11 wherein the medium further includes instructions to:

when the un-redacted portions of the at least one redacted region no longer intersect the tracked region:

modify the at least one redacted region to re-redact portions of the at least one redacted region that were un-redacted.

14. The medium of claim 11 wherein the medium further includes instructions to:

detect an object of interest in the video, the object of interest substantially occluded by the at least one redacted region; and detect a user has zoomed in on the object of interest, wherein the tracked region includes the object of interest.

15. The medium of claim 12 wherein the tracked region is congruous with the object of interest.

* * * * *